Patented Nov. 16, 1948

2,454,262

UNITED STATES PATENT OFFICE 2,454,262

DIAMINO THIADIAZINE DERIVATIVES

Henry A. Walter, Longmeadow, Mass., assignor to Monsanto Chemical Company, St. Louis, Mo., a corporation of Delaware No Drawing. Application August 6, 1947, Serial No. 766,893

2 Claims. (Cl. 260—243)

This invention relates to 3,5-diamino-4-dihydro thiadiazine-1-dioxide and to resinous materials made therefrom.

An object of this invention is to provide 3,5-diamino-4-dihydro thiadiazine-1-dioxide.

A further object is to provide a process for preparing 3,5-diamino-4-dihydro thiadiazine-1-dioxide.

Another object is to provide resinous reaction products of 3,5-diamino-4-dihydro thiadiazine-1-dioxide.

These and other objects are attained by reacting sulfamide with malononitrile and condensing the reaction product with aldehydes, with or without further reaction with alcohols.

The following examples are given in illustration and are not intended to limit the scope of this invention. Where parts are mentioned, they are parts by weight.

Example I 1 mol of sulfamide and 1 mol of malononitrile were dissolved in ethanol. The solution was maintained at room temperature, i. e., about 25–30° C. for about 1 hour during which the reaction between the sulfamide and malononitrile was completed. The reaction product precipitated from the ethanol and was recovered by filtration.

The product was a white solid which, on analysis, proved to be 3,5-diamino-4-dihydro thiadiazine-1-dioxide.

The new compound has the following structural formula:

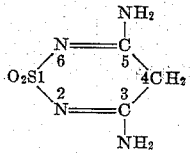

To prepare 3,5-diamino-4-dihydro thiadiazine-1-dioxide, sulfamide is reacted with malononitrile in substantially equimolar proportions. A small excess of either component may be used, but a large excess of either component will result in undesirable side reactions.

The reaction is conveniently carried out in alcohol solution at room temperatures, i. e., 20–30° C. Other alcohols beside the ethanol shown in Example I may be used, including methanol, propanol, isopropanol, butanol, isobutanol, etc. The temperature of the reaction may be varied between 15° C. and reflux temperature at atmospheric pressure. However, the reaction is sufficiently rapid at ordinary room temperatures that higher temperatures are not needed. No catalyst is necessary for accelerating the speed of the reaction, but such materials as sodium ethylate, sodium carbonate, etc., may be used.

The 3,5-diamino-4-dihydro thiadiazine-1-dioxide is insoluble in alcohols and slightly soluble in water. It may be reacted with aldehydes to form resinous products which may be further modified by reaction with alcohols.

Example II 1 mol of 3,5-diamino-4-dihydro thiadiazine-1-dioxide was mixed with 4 mols of formalin (37% formaldehyde). The mixture was adjusted to a pH of about 8–9 with aqueous sodium hydroxide and then heated at reflux at atmospheric pressure for about 30 minutes. The reaction product was dehydrated under vacuum to yield a product which, on analysis, proved to be the tetramethylol derivative of 3,5-diamino-4-dihydro thiadiazine-1-dioxide.

The reaction product was soluble in alcohols and water. It could be cured to the insoluble, infusible state by heating it for a short time at elevated temperatures.

The formaldehyde shown in Example II may be replaced in part or in whole by other aldehydes including acetaldehyde, propionaldehyde, butyraldehyde, isobutyraldehyde, octaldehyde, benzaldehyde, crotonaldehyde, cinnamaldehyde, furfural, etc. The amount of aldehyde to be used may vary from 1 to 4 mols per mol of 3,5-diamino-4-dihydro thiadiazine-1-dioxide. An excess of aldehyde may be used, if desired, the excess being recovered by distillation upon completion of the reaction.

The condensation reaction may be carried out at reflux temperature at atmospheric pressure or at temperatures as much as 50° C. below reflux. The pH of the reaction medium should be adjusted to about 8–9 and maintained at about 8–9 throughout the reaction, using an alkali such as sodium or potassium hydroxide, triethanolamine, barium hydroxide, or other alkalies or alkaline reacting compounds as regulating media.

The reaction products are recovered by distillation under vacuum, by oven drying, spray drying, or other conventional means.

The reaction products are soluble in water and alcohols and are fusible. They may be cured to an insoluble, infusible product by heating them at temperatures ranging from about 100° C. to about 200° C. for a short period of time, i. e., about 10 to about 30 minutes. No catalyst need be used to accelerate the curing, but acid curing catalysts such as benzene sulfonic acids may be used if desired to shorten the curing time or lower the curing temperature, or both.

The aldehyde condensation products of 3,5-diamino-4-dihydro thiadiazine-1-dioxide may be mixed with fibrous or granular fillers, pigments, dyes, lubricants, etc. to provide molding powders which produce articles which are exceptionally tough and resilient.

The aldehyde condensation products may be further reacted with alcohols to provide surface coating and textile treating resins. This etherification reaction may be carried out as follows:

*Example III*

1 mol of tetramethylol-3,5-diamino-4-dihydro thiadiazine-1-dioxide was dissolved in 6 mols of ethanol. The solution was made acid with formic acid and then heated at reflux temperature at atmospheric pressure for about 1 hour. The product of the reaction was a methanol solution of the tetramethyl ether of tetramethylol 3,5-diamino-4-dihydro thiadiazine-1-dioxide. The excess methanol was removed by distillation to yield a slightly yellow liquid resin.

The methanol of Example III may be replaced in whole or in part by other monohydric alcohols including ethanol, propanol, isopropanol, butanol, pentanols, 2-ethylhexanol, stearyl alcohol, cetyl alcohol, etc. The amount of alcohol used will depend somewhat on the number of alkylol groups introduced during the aldehyde condensation step. In general, the amount of alcohol used will be at least as great on a molar basis as the amount of aldehyde used. Preferably, an excess of alcohol is used to act as a solvent during and after the reaction. The amount of alcohol used thus will vary from about 1 to 4 or more mols per mol of the aldehyde condensation product of 3,5-diamino-4-dihydro thiadiazine-1-dioxide.

The etherification reaction is preferably carried out at the reflux temperature at atmospheric pressure but may be carried out at temperatures substantially lower than reflux, especially if high boiling alcohols are used. In some cases, it is advantageous to carry out the etherification reaction at temperatures as low as 20° C.–40° C.

The pH of the etherification reaction mixture should be adjusted to below 7 and preferably from about 5 to 7. Various acids may be used as pH regulating means such as sulfuric, formic, acetic, acrylic, etc., acids. The ether resins may also be made by the simultaneous reaction between the aldehyde, the alcohol and the 3,5-diamino-4-dihydro thiadiazine-1-dioxide at a pH of about 5–7.

The products of the reaction between alcohols and the aldehyde condensation products of 3,5-diamino-4-dihydro thiadiazine-1-dioxide are light colored liquids. They are soluble in alcohols and aromatic hydrocarbons such as benzene, toluene, xylene, etc. The resins may be used alone or in conjunction with fillers, pigments, dyes, natural and synthetic resins, etc., as surface coating materials and may be hardened on coated surfaces at temperatures ranging from 100 to 200° C. with or without a curing catalyst to provide hard, tough coatings.

The ether resins may also be used to treat various textiles to creaseproof and shrinkproof them. Their property of curing rapidly at relatively low temperatures without the aid of an acid catalyst makes them especially desirable for treating textiles.

The ether resins may also be used to modify alkyd resins to increase the toughness of the latter.

The resinous reaction products of 3,5-diamino-4-dihydro thiadiazine-1-dioxide are not claimed in this application but are set forth and claimed in my continuation-in-part application S. N. 27,367, filed May 15, 1948.

It is obvious that many variations may be made in the processes and products of this invention without departing from the spirit and scope thereof as defined in the appended claims.

What is claimed is:

1. 3,5-diamino-4-dihydro thiadiazine-1-dioxide having the following structure

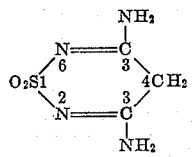

2. A process for preparing 3,5-diamino-4-dihydro-thiadiazine-1-dioxide which comprises reacting together substantially equimolar proportions of sulfamide and malononitrile in solution in an alcohol and recovering said 3,5-diamino-4-dihydro-thiadiazine-1-dioxide.

HENRY A. WALTER.

REFERENCES CITED

The following references are of record in the file of this patent:

UNITED STATES PATENTS

| Number | Name | Date |
|---|---|---|
| 2,191,452 | Coghill | Feb. 27, 1940 |
| 2,211,710 | Zerweck et al. | Aug. 13, 1940 |
| 2,273,664 | Searle | Feb. 17, 1942 |
| 2,310,004 | Widmer et al. | Feb. 2, 1943 |

Certificate of Correction

Patent No. 2,454,262. November 16, 1948.

HENRY A. WALTER

It is hereby certified that error appears in the printed specification of the above numbered patent requiring correction as follows:

Column 4, lines 33 to 36 inclusive, claim 1, in the formula, for

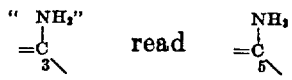

and that the said Letters Patent should be read with this correction therein that the same may conform to the record of the case in the Patent Office.

Signed and sealed this 29th day of March, A. D. 1949.

[SEAL]

THOMAS F. MURPHY,
*Assistant Commissioner of Patents.*